United States Patent [19]

Gyoury et al.

[11] Patent Number: 5,036,596
[45] Date of Patent: Aug. 6, 1991

[54] MACHINE TOOL PRE-SETTING TOOL

[76] Inventors: Christopher J. Gyoury, 325 Buckingham Forest Ct., Woodstock, Ga. 30188; Andrew J. Cisternino, 2142 Foxhound Chase, Marietta, Ga. 30062

[21] Appl. No.: 487,410

[22] Filed: Mar. 2, 1990

[51] Int. Cl.$^5$ ............................................ B23Q 17/22
[52] U.S. Cl. .................................... 33/636; 33/832; 33/DIG. 1; 33/558; 82/173; 408/16; 409/218
[58] Field of Search ............... 409/210, 206, 218, 220; 408/241, 16, 76; 33/636, 710, 558, 201, 464, 628, 559, 832, 833, 626, 838, DIG. 1; 82/173

[56] References Cited

U.S. PATENT DOCUMENTS

| | | | |
|---|---|---|---|
| 2,519,942 | 8/1950 | Tedrick | 33/832 |
| 3,251,133 | 5/1966 | Turtschan | 33/832 |
| 3,292,267 | 12/1966 | Wilterdink | 408/16 X |
| 3,701,199 | 10/1972 | Lewis | 33/201 X |
| 4,106,240 | 8/1978 | De Bartolo | 33/832 X |
| 4,228,595 | 10/1980 | Steinbach | 33/628 X |

FOREIGN PATENT DOCUMENTS 402262  4/1909  France .................................... 33/838

Primary Examiner—Larry I. Schwartz
Assistant Examiner—Robert Schultz
Attorney, Agent, or Firm—Thomas, Kerr & Kayden

[57] ABSTRACT

An apparatus for the positional adjustment of cutting tools for use on machine tools has a first block having a gauging surface mounted thereon and translationally and swivelly movable on a perpendicular shaft. A second block is coupled to the first block in such a manner that the two blocks move together translationally with the first block being free to swivel relative to the second block. The second block carries indicating means for indicating the amount of translational movement of the two blocks.

12 Claims, 2 Drawing Sheets

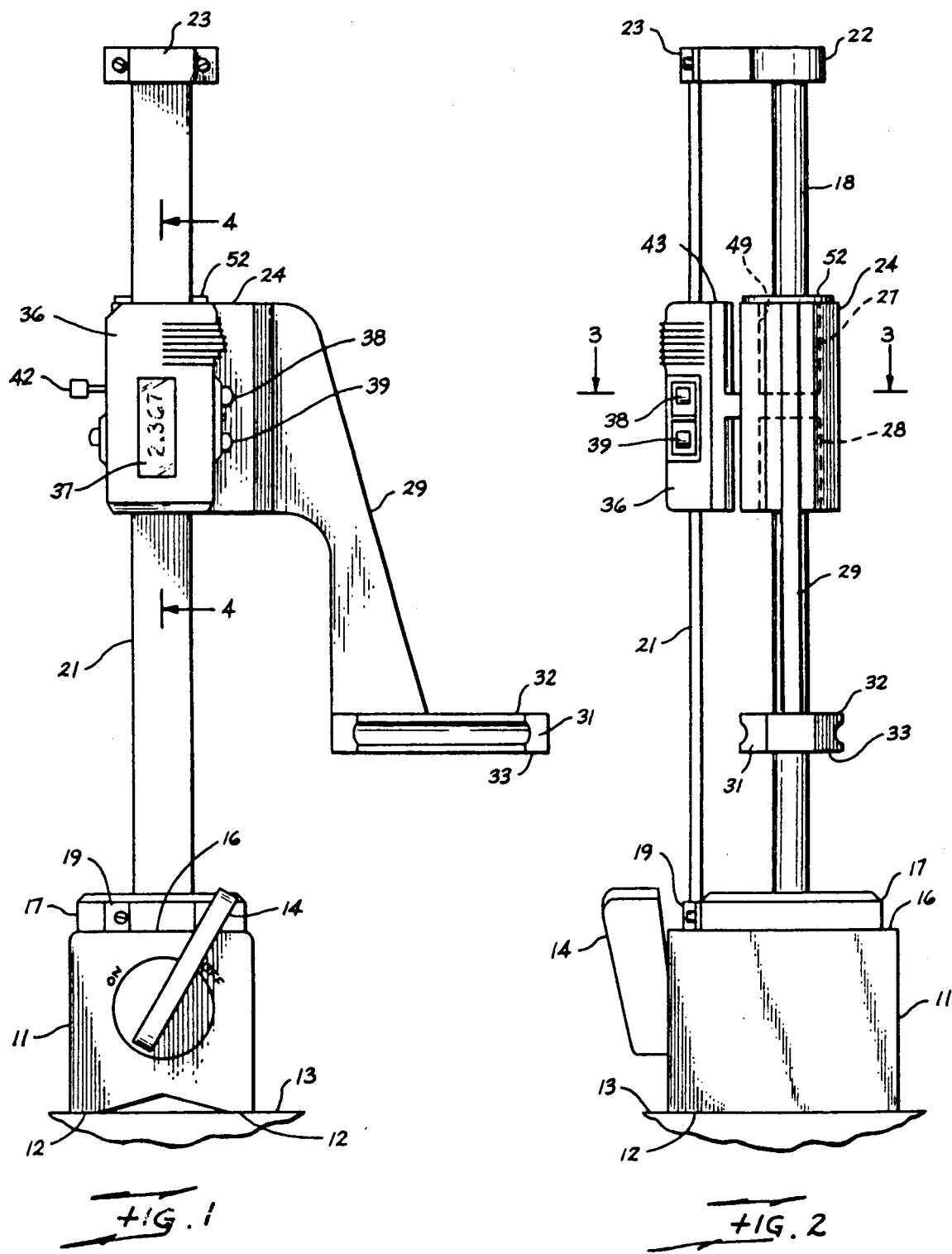

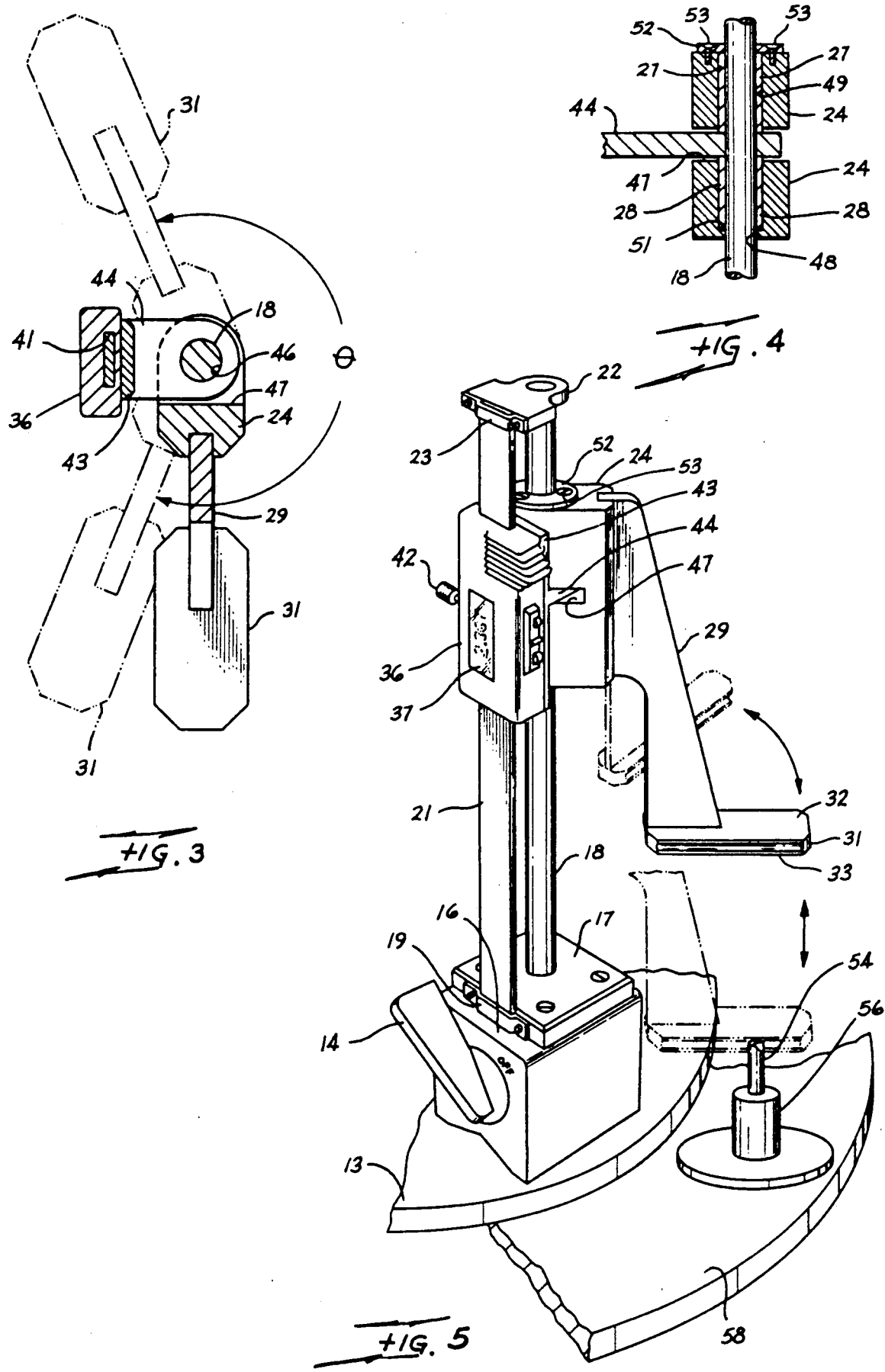

MACHINE TOOL PRE-SETTING TOOL

BACKGROUND OF THE INVENTION

This invention relates to machine tool pre-setting, and, more particularly, to an apparatus and method for the positional adjustment of cutting tools for use on machine tools.

In automatic, repetitive machining operations, it is highly desirable to reduce the machine tool down time during such operations, resulting from, for example, the necessity to replace worn or broken cutting tools. Also, modern computer controlled machines such as lathes and machining centers are called upon to perform a wide range of operations, thus switching from one set of cutting tools necessary for one group of operations to a new set of cutting tools for a second, different group of operations necessitates machine down time.

One well known and recognized problem in adjusting and accurately fixing internal cutting tools such as drills, reamers, and boring tools in the tool holder or turret of, for example, a computer numerically controlled lathe (CNC lathe) is the absence of any readily available means for locating the end or cutting tip of the cutting tool in the same position repeatedly. Thus replacing worn or broken tools requires performing new setting-up operations for each tool, and each time the operation is changed, new setting up must be performed.

Normally, in a typical setting up operation, each tool is first adjusted by sight to something approximating its proper setting and is then brought down to a datum surface, which can be the bed of the machine, in order to determine the arbitrary position of that tool and enter its value into the computer that controls the machinery tool in question. This operation is time consuming, and must be performed for each cutting tool. It can be seen that replacing a worn or broken tool requires that this setting up operation be performed, thus holding the machine out of operation. Such replacement of tools, when done on an individual basis, produces an extreme amount of non-productive down time. Likewise, when the machine is switched to a second group of operations, the setting up procedure must be performed on each tool, resulting in an inordinate amount of idle time for the machine.

BRIEF DESCRIPTION OF THE INVENTION

The present invention is a simplified apparatus for providing a quick and accurate means for adjusting the cutting edge of a cutting tool to a specific distance out from its holder, thereby simplifying and speeding up the setting-up process, which in turn reduces machine down time. The apparatus further can be used to preset cutting tools in their holders, thus greatly reducing the duration of the process of replacing a worn or broken tool, which also reduces machine down time.

In a preferred embodiment of the invention, the apparatus comprises a base member having machined upper and lower surfaces, with magnetic or other means for clamping the lower surface to a datum surface, such as the machined face of the machine turret or tool carrying member. Extending from the upper surface of the base member and perpendicular thereto is an elongated cylindrical bearing surface or shaft which is affixed at its proximal end to the base member. Slidably mounted on the cylindrical shaft is a first block having a cylindrical bore with bushings therein for enabling the block to move up and down and to rotate smoothly relative to the shaft. Depending from the block is an arm having mounted on its distal end a flat measuring or gauging pad having a machined lower surface parallel to the upper and lower surfaces of the base member.

Also extending upwardly from the upper surface of the base member is an elongated linear measuring member oriented parallel to the shaft along their lengths, and an anchor block member at the top of the measuring member anchors it relative to the shaft so that parallelism is maintained. Slidably mounted on the measuring member is a second block having a readable scale member, which is hinged to the first block mounted on the shaft in a manner such that the first block may be rotated relative to the scale member, but any linear or translational movement of either the second block or the first block is translated to the other block. The readable scale member preferably is a digital read-out device, such as an LCD device, so that longitudinal or translational movement of the second block, and its resulting position, are accurately indicated by the readout.

In operation, the base member is affixed to the machined reference surface on the turret, for example, and the bottom surface of the measuring pad is moved into contact with the reference surface at which position the read-out device is set to zero. The first block and its arm assembly is then swivelled and moved longitudinally until the bottom surface of the pad touches the tip of the cutting tool, or until the pad is positioned at the desired height and the cutting tool moved into contact with it. Because the datum surface is constant, when a tool is correctly positioned, the read-out is noted and recorded. Subsequent replacement of that tool with a new one requires only that the pad be positioned at the correct read out and the tool moved into contact with it.

The numerous features and advantages of the present invention as well as the details thereof will be more readily apparent from the following detailed description, read in conjunction with the drawings.

BRIEF DESCRIPTION OF THE DRAWINGS

FIG. 1 is an elevation view of the apparatus of the present invention;

FIG. 2 is an elevation view of the apparatus of the invention rotated ninety degrees relative to FIG. 1;

FIG. 3 is a sectional plan view of the apparatus along the line 3—3 of FIG. 2;

FIG. 4 is a cross-sectional view along the line 5—5 of FIG. 1; and

FIG. 5 is a perspective view of the apparatus of the invention as used in setting up a cutting tool.

DETAILED DESCRIPTION

In FIG. 1 there is shown the apparatus of the present invention in a preferred embodiment thereof. While the machine and apparatus are shown with a vertical orientation, a horizontal orientation would in no way affect or change the operation of the apparatus. The apparatus comprises a base member 11 having a machined, preferably ground and lapped, bottom surface 12 adapted to rest upon a flat datum surface 13. Within member 11 is a magnetic anchoring means, not shown, of a type well known in the art, and a switch handle 14 is provided for activating and de-activating the magnetic anchor. When it is activated, surface 12 is firmly anchored to surface 13. The top surface 16 of member 11 is also machined, again preferably ground and lapped to be flat and parallel to the machined surface 12 forming a datum or reference surface. Mounted on surface 16 and affixed thereto as by bolting is a base plate 17 and a vertical cylindrical shaft 18, as best seen in FIG. 2, is mounted thereto. Shaft 18 is mounted so as to be perpendicular to surfaces 12 and 16, and is maintained thus by base plate 17. Clamped to one side of plate 17, by a suitable clamp 19, is an elongated linear measuring member 21 which extends parallel to shaft 18 throughout their lengths. To preserve parallelism and insure rigidity, the distal ends of shaft 18 and member 21 are clamped together by a clamping block 22, which fits snugly over the distal end of shaft 18, and a clamp 23, which clamps the distal end of member 21 to block 22.

It is to be understood that the terms "perpendicular" and "parallel" mean that the normal machine tolerances apply. Thus, for example, "parallel" may not mean absolutely parallel, but parallel within allowable tolerances.

A first block 24 has a bore 49 extending therethrough into which are fitted first and second bushings 27 and 28. Bushings 27 and 28 make it possible for block 24 to move smoothly up and down shaft 18 and to rotate relative thereto with a minimum of play or backlash, as will be discussed more fully relative to FIG. 4. Affixed to or integral with block 24 is a depending arm 29, the lower end of which has mounted or affixed thereto a measuring pad 31 having machined, preferably ground and lapped, parallel upper and lower surfaces 32 and 33. Pad 31 is preferably made of hardened tool steel. With shaft 18 being perpendicular to surfaces 12 and 16, and assuming no play in the member 24 mounting, surfaces 32 and 33 are parallel to surfaces 12 and 16, and hence to datum surface 13 when the apparatus is mounted thereon.

Slidably mounted on measuring member or scale 21 is a second block 36 having a digital linear measuring member 37 with adjusting buttons 38 and 39 for zero setting or for setting a particular value in the digital read out of member 37. An example of such a linear measuring member is one manufactured by Mitutoyo of Japan and identified as Digimatic #572-211-50. It is to be understood that other commercially available linear measuring devices with suitable readout could be used, that discussed here being merely by way of example. Block 36 has a rectangular bore 41 as best seen in FIG. 3 extending therethrough which is a slip fit over linear scale member 21, permitting block 36 to slide smoothly up and down member 21, and a holding screw 42 is provided for locking block 36 on scale 21 at any desired location. It is a characteristic of linear measuring member 37, which bears against member 21 in a known manner, that it measures the distance of movement of block 36 along scale 21 and indicates the changes in distance in its readout, which may be, for example, an LCD display device.

A bracket member 43 is mounted on, or may be integral with block 36, and has a centrally located tongue 44 having a bore 46 in its distal end which is a loose fit on shaft 18. Tongue 44 fits into a slot 47 in support block 24, as best seen in FIGS. 3 and 4. In FIG. 4 it can be seen that bearings 27 and 28 bear against the upper and lower surfaces of tongue 44, so that translational movement of either block 36 or block 24 causes corresponding movement of the other member, yet block 24 is free to swivel with respect to block 36, as depicted in FIG. 3, through more than 180 degrees.

In FIG. 4 there is shown a preferred arrangement for eliminating play or backlash between members 24 and 36 so that they move smoothly together and the readings obtained from device 37 are accurate for member 24, and hence measuring pad 31. Block 24 has a first bore 48 that represents a sliding fit on shaft 18 and a counterbore 49 coaxial with bore 48, which extends almost the entire length of block 24 and forms with bore 48 a shoulder 51. The diameter of bore 49 is such that bushings 27 and 28 are snug or press fits therein, and the lower end of bushing 28 rests upon shoulder 51. As can be seen in FIG. 4, the bushing lengths are slightly greater than the length of the bore 49 in which they are located so that, when seated, they bear against the upper and lower surfaces of tongue 44. For best results, these surfaces are machined and ground. A slack elimination arrangement comprises a plate 52 bolted to the top of block 24 by bolts 53, the under surface of which bears against the top of bushing 27, whose length is such that when its lower end bears against the top surface of tongue 44, its upper end protrudes slightly above the top surface of block 24. Thus when bolts 53 are tightened, plate 52 presses the lower end of bushing 27 firmly against the top surface of tongue 44, and the bottom surface of tongue 44 is pressed firmly against the top of bushing 28, the bottom end of which is translationally fixed by shoulder 51. Such as arrangement permits compensating for the inevitable wear that occurs where the bushings bear against tongue 44, so that slack and backlash can be virtually eliminated regardless of the conditions of wear. If desired, shoulder 51 may be eliminated and a plate similar to plate 52 bolted to the bottom of block 24. Such an arrangement would afford an added range of adjustment for eliminating slack.

OPERATION

FIG. 5 is a perspective view depicting aspects of the operation of the tool pre-setter of the present invention. In operation, for an initial set-up, the apparatus is clamped to the datum surface 13 of the machine by means of the switch 14 and the magnetic clamping means, in a location adjacent one or more cutting tool positions, as represented by tool 54 and tool holder 56 mounted on turret face 58, which is a known distance from datum surface 13. Support block 24 is then lowered and swivelled or rotated to where bottom surface 33 of pad 31 bears against reference or datum surface 13. The readout of measuring member 37 is then set to zero, for example, or to a value representing the difference in height between surfaces 11 and 58, by activation of the buttons 39 and 38. The block 24 is then raised and swivelled so that surface 33 touches the tip of tool 54, and the readout indicates the height of the tool tip above surface 58. The reading is noted and the process repeated for each of the cutting tools in the turret. The ability of block 24 to swivel makes it possible to measure several tool heights for one clamping location of the apparatus. After all of the tool locations and heights have been noted, a trial part is machined, after which the various holes, bores, and the like are critically measured and the deviations from the dimensional specifications called for in the design drawings are noted. Any significant deviations are then compensated for in the computer program in order that the machined part adheres within tolerances to the dimensions required.

When, for example, a tool breaks, it is removed and a new tool is mounted in its place. Inasmuch as the correct readout value is already known, the apparatus is set to that value and fixed by screw 42, and the tool adjusted until its tip touches surface 33 of pad 31. Thus it can be seen that replacing a broken or worn tool is a matter of a very few minutes, thereby materially reducing machine down time. Also, where it is necessary to switch from one set of operations for a first production run to another set of operations for a second, different, productions run, inasmuch as the tool setting values relative to the readout have previously been noted, it is a simple matter to set the new tools properly merely by reference to the noted readout values.

The apparatus of the present invention also makes it possible to pre-set the tool positions relative to their holders, so that changing tools simply requires removing and replacing with no measurement taking place on the machine. Thus replacement tools can easily be made ready and stored until needed. This process requires a substitute datum surface and a dummy tool spindle mounted on, for example, a bench, and the relationship of the spindle to the datum surface must be the same as for the machine on which the tools are to be used. In this procedure the tools are mounted in their holders and placed in the dummy spindle. The apparatus of the invention is then secured adjacent or on the datum surface, and the tools set and locked within their holders as discussed in the foregoing. Thus a ready supply of substitute tools may be produced, to be used when needed, greatly reducing machine down time normally necessitated by the need to replace one or more tools.

It can be seen from the foregoing that the pre-setter apparatus of the present invention provides a simple, rapid procedure for changing cutting tools in a machine tool without involving undue down time. In addition, tool setting may be performed away from the machine so that down time thereof is minimized.

While the foregoing description of the invention relates to a preferred embodiment thereof, it will be readily apparent that numerous changes to or variations thereof may occur to workers in the art without departure from the spirit and scope of the invention.

We claim:

1. An apparatus for positionally adjusting and setting cutting tools for use on machine tools, said apparatus comprising
a base member having first and second machined parallel surfaces,
means for clamping said first machined surface to a datum surface,
an elongated shaft extending from said second surface perpendicular to said first and second surfaces,
a first block having a bore therein for slidably mounting said first block on said shaft, said first block having a gauging pad mounted thereto.
an elongated linear measuring member extending from said second surface parallel to said shaft,
a second block slidably mounted on said measuring member,
and means for transmitting translational movement of one of said blocks to the other of said blocks while permitting rotation of said first block relative to said second block.

2. An apparatus as claimed in claim 1 and further including indicator means mounted on said second block for indicating the amount of translational movement of said first and second blocks.

3. An apparatus as claimed in claim 1 and further including means for locking said second block to said elongated linear measuring member.

4. An apparatus as claimed in claim 1 wherein said elongated shaft has a first end adjacent said second surface and a second end, and said measuring member has a first end adjacent said second surface and a second end and further including means joining the second end of said shaft and the second end of said measuring member in spaced relationship for maintaining said shaft and said linear measuring member in fixed parallel relationship.

5. An apparatus as claimed in claim 1 and further including an arm having first and second ends mounted at its first end to said first block and said gauging pad having upper and lower surfaces is mounted to its second end.

6. An apparatus as claimed in claim 5 wherein said gauging pad has a machined lower surface parallel to said first and second surfaces of said base member.

7. An apparatus as claimed in claim 1 wherein said means for transmitting translational movement comprises a tongue member extending from said second block toward said first block, said first block having a slot therein for receiving said tongue member, and said tongue member having a bore therein remote from said second block through which said shaft passes.

8. An apparatus as claimed in claim 7 wherein said tongue member has first and second surfaces, and said bore in said first member contains a first bushing adapted to bear at one end thereof against said first surface of said tongue.

9. An apparatus as claimed in claim 8 wherein said bore contains a second bushing adapted to bear at one end thereof against said second surface of said tongue.

10. An apparatus as claimed in claim 9 and further including means for supporting the end of said second bushing remote from said one end.

11. An apparatus as claimed in claim 10 wherein said means for supporting comprises a shoulder formed in said first block.

12. An apparatus as claimed in claim 8 and further including means for reducing backlash comprising compression means mounted externally on said first block and adapted to apply compressive force to the end of said first bushing remote from said one end.

* * * * *